March 17, 1925.
C. L. WILSON
MOLD FOR RUBBER SOLES
Filed July 1, 1924
1,530,025
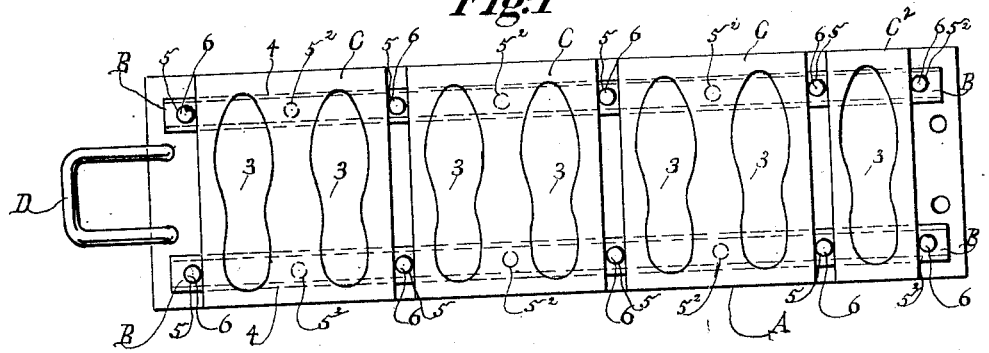
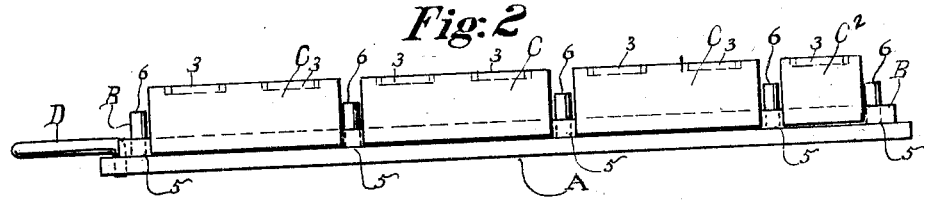
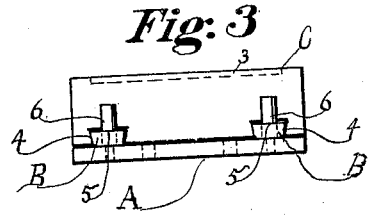 
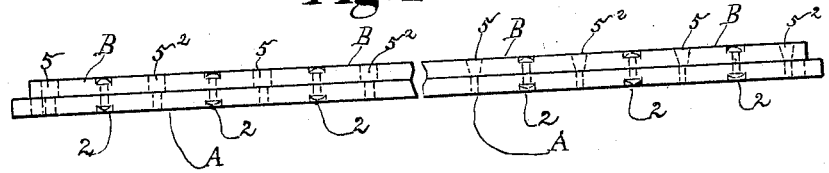
INVENTOR.
Claude L. Wilson
BY F. N. Gilbert
ATTORNEYS.

Patented Mar. 17, 1925.

1,530,025

UNITED STATES PATENT OFFICE.

CLAUDE L. WILSON, OF JOHNSON CITY, NEW YORK.

MOLD FOR RUBBER SOLES.

Application filed July 1, 1924. Serial No. 723,459.

*To all whom it may concern:*

Be it known that I, CLAUDE L. WILSON, a citizen of the United States, residing at Johnson City, in the county of Broome and State of New York, have invented certain new and useful Improvements in Molds for Rubber Soles, of which the following is a specification.

My invention relates to improvements in molds for the manufacture of soles of rubber or other like material for use on shoes or other footwear, and has for its object to provide a means for securely, adjustably and removably mounting the molds on the mounting plates for molding the soles.

With these objects in view my invention consists in certain novel features of construction and arrangement of parts as are hereinafter more particularly described and pointed out in the claims, reference being had to the accompanying drawings, in which:

Fig. 1 is a plan view of my device, with the molds in mounted position.

Fig. 2, is a side view of my device with the molds mounted as before stated.

Fig. 3 is an end view of my device.

Fig. 4 is a side view of a fragmentary part of my device.

Fig. 5 is a side view of a part of my device.

Fig. 6 is a side view of a part of my device.

The same reference characters denote like parts in each of the several figures of the drawings.

In carrying out my invention, I have the usual mold holding plate A; mounted on plate A, I have the parallel beveled rails B, B which are secured to the plate A by means of the rivets 2, 2 or screws or in any other convenient manner; as a further part of the device I have the mold forms C, C, C for molding the soles in the usual manner, and having therein the matrices 3, 3; in the bottom of the mold bodies C, C, I have the parallel beveled longitudinal grooves 4, 4 adapted to slidably receive and be mounted on the beveled rails, B, B; in the rails B, B, I have the pin holes 5, 5 and $5^2$, $5^2$ for receiving spacing pins 6, 6 and 6', 6'; the spacing pins may be of the same diameter throughout their length as shown in Fig. 5 or pointed as shown in Fig. 6; or may be screw threaded. The pins 6, 6' are adapted to be removably mounted in the rails as before described and hold spaced apart the molds C, C as shown in Figs. 1 and 2; mounted in the end of plate A, I have removably mounted in any convenient manner the draw handle D, for more easily moving in and out of the molding press, the plate A with the molds C, C mounted thereon. In the process of molding soles, the plate A has usually mounted thereon three sets of double molds, C, C, C and one single mold $C^2$ or a plurality of single and double molds, and to permit of an adjustable grouping or arrangement of the molds on the plate A, between the spacing pin openings 5, 5 for a double mold I have placed an additional pin opening $5^2$ to permit of spacing pins for holding a single mold or molds $C^2$.

In the operation of my device, in the usual arrangement of the molds upon plate A, I first mount thereon $C^2$ by having the beveled channels in mold $C^2$ engage the beveled rails B, B, and slide the mold $C^2$ along the rails until it reaches a position shown in Fig. 1; I then place in the pin openings 5 and $5^2$ the pins 6, 6 adjacent to the mold $C^2$, holding it in firm position against a sliding movement along the rails B, B; I then follow $C^2$ with a double mold C, moving it along the rails B, B until it reaches a position adjacent to the pins 6, 6 mentioned, and then mount another set of pins 6, 6 in the openings 5, 5 adjacent to mold C holding it in firm position on the rails, and so on with the additional molds C, C until the plate A has mounted upon it the full quota of molds desired. Then by taking hold of handle D, I move plate A to its position within the molding press. A different arrangement of the molds can be made by changing the position of the pins 6, 6 in the openings along the rails B, B. When the molding process is completed, by taking hold of handle D, I withdraw the plate of molds, and by removing pins 6, 6 take off the molds and refill plate A with new molds, and place it again in the molding press as before described.

Having thus described by invention, what I claim as new and for which I desire Letters Patent is as follows:

1. In a mold for rubber soles, a mounting plate, a plurality of molds mounted thereon, removable means for spacing the molds apart on the plate, means for holding the molds slidably mounted on the plate, spaced apart and positioned on the plate, a removable handle mounted on the end of the plate.

2. In a mold for rubber soles, a mold holding plate, two parallel rails longitudinally mounted on the plate surface, a plurality of mold bodies, and means for slidably mounting the mold bodies on the rails, and for holding the molds thereon spaced apart, means for removing the molds from the plate, a handle removably mounted on the plate.

3. In a mold for rubber soles, a holding plate, two parallel rails the top surfaces of which are broader than the bottom surfaces, longitudinally mounted on the plate surface, a plurality of molds having two parallel beveled longitudinal recesses in the bottom surface of the molds, adapted to slidably engage the rails, openings spaced apart in the rails, for removably mounting spacing pins therein adjacent to the molds, a handle removably mounted in the plate.

4. In a mold for rubber soles, a holding plate, two parallel beveled rails, having top surfaces broader than the bottom surfaces, longitudinally mounted on the plate, one or more mold bodies having parallel beveled recesses in the bottom surfaces thereof, adapted to slidably receive the rail ends and be removably and slidably positioned spaced apart on the rails, removable means for holding the molds spaced apart on the rails, a removable handle mounted on the plate.

In testimony whereof I have affixed my signature.

CLAUDE L. WILSON.